US012276840B2

(12) United States Patent
Kose et al.

(10) Patent No.: US 12,276,840 B2
(45) Date of Patent: Apr. 15, 2025

(54) HOLLOW CORE FIBER AIR-GAP CONNECTOR

(71) Applicant: Panduit Corp., Tinley Park, IL (US)

(72) Inventors: Bulent Kose, Burr Ridge, IL (US); Jose M. Castro, Naperville, IL (US); Yu Huang, Orland Park, IL (US); Richard J. Pimpinella, Prairieville, LA (US)

(73) Assignee: Panduit Corp., Tinley Park, IL (US)

( * ) Notice: Subject to any disclaimer, the term of this patent is extended or adjusted under 35 U.S.C. 154(b) by 175 days.

(21) Appl. No.: 17/981,890

(22) Filed: Nov. 7, 2022

(65) Prior Publication Data
US 2024/0151904 A1   May 9, 2024

(51) Int. Cl.
*G02B 6/25* (2006.01)
(52) U.S. Cl.
CPC ..................... *G02B 6/25* (2013.01)
(58) Field of Classification Search
CPC ........ G02B 6/25; G02B 6/3818; G02B 6/382; G02B 6/3825; G02B 6/3833; G02B 6/3847; B02B 6/02304
USPC ....................................... 156/73.3
See application file for complete search history.

(56) References Cited

U.S. PATENT DOCUMENTS

| 11,774,676 B2 * | 10/2023 | Bickham .................. G02B 6/25 |
| | | 219/121.67 |
| 2007/0014528 A1 | 1/2007 | Busse et al. |
| 2012/0057829 A1 | 3/2012 | Benjamin et al. |

FOREIGN PATENT DOCUMENTS

| WO | 2004111695 A1 | 12/2004 |
| WO | 2022044891 A1 | 3/2022 |

OTHER PUBLICATIONS

Maejima Toshiki, et al.: "Connection Characteristics of Hollow-Corr Fiber Connector", 2021 IEEE CPMT Symposium Japan (ICSJ), IEEE, Nov. 10, 2021, pp. 106 and 107.

* cited by examiner

*Primary Examiner* — James D Sells
(74) *Attorney, Agent, or Firm* — Christopher K. Marlow; Christopher S. Clancy; James H. Williams

(57) ABSTRACT

An air-gap HCF connector termination method and connector assembly for factory and field connector assembly termination for patch cables and trunk cables made from HCF, where in multitude of mechanisms can facilitate air-gap between the first and second HCF fiber end-faces, comprising preparing the HCF end-faces using appropriate cleaving methods including mechanical, ultrasonic and laser cleaving, such that the air-gap separation between first and second HCF's can be anywhere between 0.5-100 microns, where reflection at the connector interface is low with RL>35 dB, due to HCF propagation mode effective index matching with index of air.

11 Claims, 8 Drawing Sheets

HOLLOW CORE FIBER AIR-GAP CONNECTOR

FIELD OF INVENTION

The present invention relates to the field of optical network interconnections and optical assemblies and, more specifically, to factory and field termination of hollow core optical fibers that are commonly used in low latency networks.

BACKGROUND AND PRIOR ART EVALUATION

For some high speed link applications, such as high speed trading, reducing link latency has become very critical. One of the ways to reduce the latency drastically is to change the fiber waveguide, where the core is no longer glass with higher refractive index compared to silica glass cladding, but instead the core is hollow core, air-gap. Hollow Core Fibers (HCF) have been proposed, modeled and developed in the last ten years or so. Initial HCFs had very high attenuation and it was difficult to use them in telecom/datacom applications with reaches of hundreds of meters or more. Recently, with design and manufacturing optimizations, fiber attenuation is reduced to a reasonable level, where these fibers find applications especially in high speed trading. FIG. 1 shows several different HCF constructions.

One key aspect of HCF's is that the fundamental propagation mode effective index of these special optical fibers are very close to plane wave propagation in air, and therefore HCF-air interface has a very small reflection, therefore very high RL. For example, the refractive index of a commercially available HCF measured by the authors of this disclosure is $n_{ref}=1.000476$. Due to Fresnel reflection based on this refractive index, RL is 72 dB, Air-gap connectors with HCF can potentially achieve very high RL, levels that are only possible with glass fiber APC connectors.

One significant problem with these fibers is the difficulty of terminating them with various optical connectors, such as MTP, LC, CS and SC. Currently, most manufacturers splice HCF's to standard compliant single mode fiber to terminate HCF trunk cables. The problem with this is when connected together by a splice, the air core of HCFs and core refractive index of standard SMFs have significant index mismatch and this results in significantly high connector reflections or significantly low return loss. High speed applications using single mode transceivers cannot operate reliably when channel reflections are high, therefore HCF connectors must be optimized to reduce reflections due to index mismatch.

In this disclosure, we describe a simple method to easily terminate HCFs in any of the industry standard connector types in the field. The simple method relies on cleaved HCF and a method to create recess at the ferrule end so adjoining HCFs do not touch each other in a non-contact recessed connector. Due to the brittle nature of HCF's, end-face preparation by polishing is not easy and not practical for most HCFs because of collapsing air holes and polishing debris getting inside the air holes in the fiber core. However, for connecting two HCFs together, physical contact based connectors are not necessary because the effective index of HCFs are very close to index of air and therefore there is no reflection at the HCF-air-HCF interface.

It is not possible to connect the disclosed HCF recessed field terminable connector directly to high speed optical transceivers because transceivers are designed to minimize reflection when standard glass single mode fiber connectors are used. However, as shown in FIG. 2, an optical network cabling channel may be comprised of multiple trunk cable sections. At each connection location at midpoint sections, connectors built by the disclosed field termination method can be used. The patch cords at the midpoint sections can also be built using the disclosed method. Disclosed recessed fiber termination significantly reduces connector insertion loss because the method allows to connect similar fibers together, as opposed to dissimilar fibers in the current methods used. The return loss of the connectors based on the disclosed method is also very high, because of the index matching of HCF with air-gap between the HCFs.

SUMMARY

An air-gap HCF connector termination method and connector assembly for factory and field connector assembly termination for patch cables and trunk cables made from HCF is disclosed. Multitude of mechanisms can facilitate air-gap between the first and second HCF fiber end-faces. The method includes preparing the HCF end-faces using appropriate cleaving methods including mechanical, ultrasonic and laser cleaving, such that the air-gap separation between first and second HCF's can be anywhere between 0.5-100 microns, wherein reflection at the connector interface is low with RL>35 dB, due to HCF propagation mode effective index matching with index of air.

DESCRIPTION OF THE INVENTION

The disclosed invention is a method to factory and field terminate HCFs, with and without polishing. Existing field termination connector assemblies can be used with this method.

Figure 1:
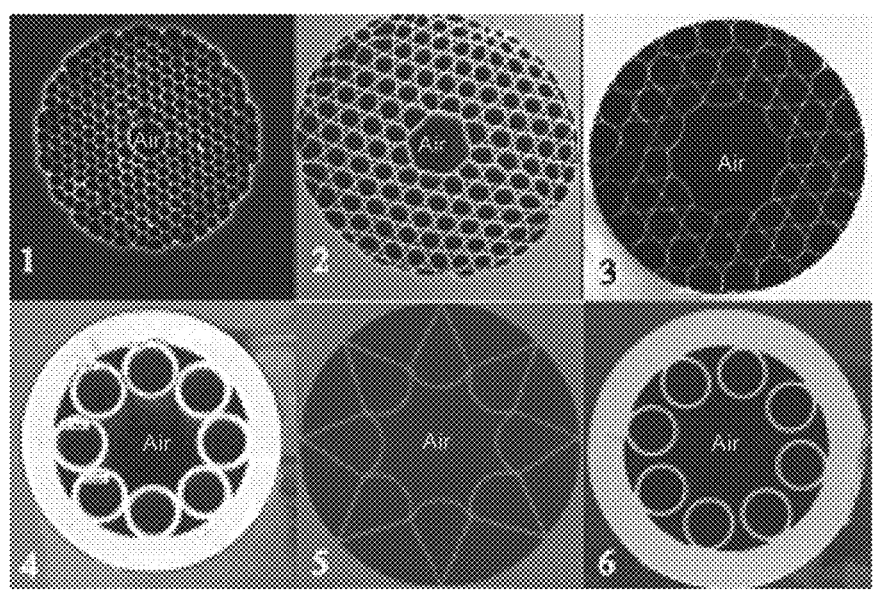
FIG. 1 shows SEM images of different hollow core fiber designs.
Figure 2:
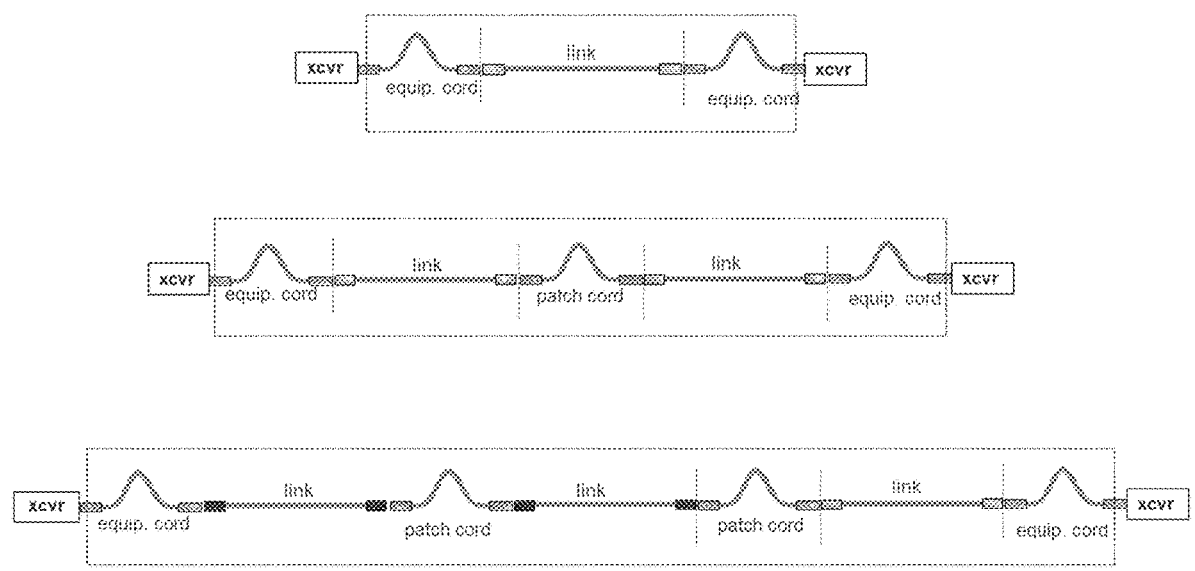
FIG. 2 shows some typical channel configurations.
Figure 3:
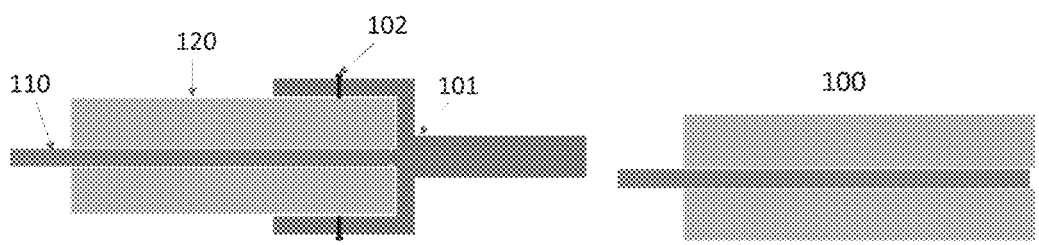
FIG. 3 shows a first embodiment of a field terminable recessed HCF connector and assembling method.
Figure 4:
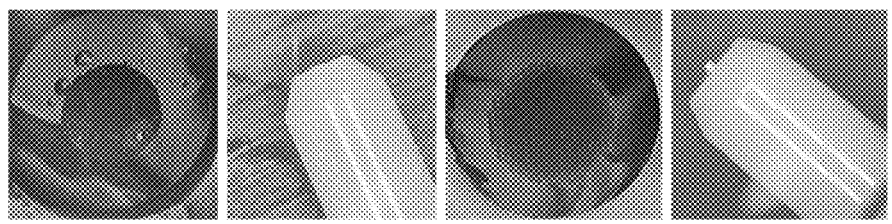
FIG. 4 shows a second embodiment with cleaved end-face of HCFs.
Figure 5:
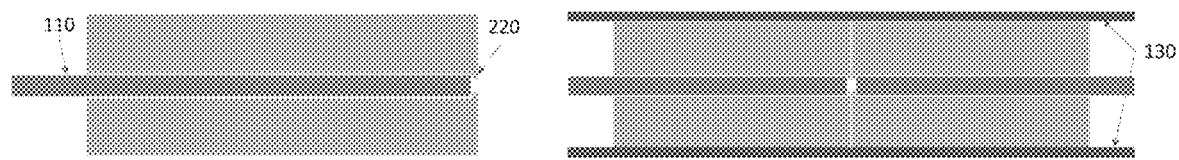
FIG. 5 shows a third embodiment of a field terminable recessed HCF connector and assembling method, using ferrule with a stop at the end-face side, to provide the air-gap.

The authors of this disclosure describe several embodiments and termination methods for HCF air-gap connectors. In one embodiment as shown in FIG. 3, the cleaved HCF is attached inside a ferrule with the help of an end-cap 101, to achieve the desired fiber end-face recess. The HCF is cleaved using an appropriate method protecting the integrity of the hollow core structure of the fiber at the end-face. Mechanical, ultrasonic and laser cleaving methods can be used for cleaving. Due to the sensitive nature of end-face, if possible, end-face can be left un-polished. Un-polished end-face may impact the air-gap separation, but otherwise it will not impact the connector IL and RL significantly. If the end-face must be polished, care must be applied due to the brittle nature of air hole structures of HCFs. A special polishing method has to be developed to facilitate removing cleaving artifacts, especially from the perimeter of the fiber end-face, where the glass is usually continuous and without air holes. Methods to remove small size glass debris and water or other polishing liquid from the air holes is necessary for the integrity of the polished HCF end-face. FIG. 4 shows cleaved end-face examples of two different commercially available HCFs studied by the authors.

In one embodiment, end-cap 101 can be secured to the ferrule with rubber-padded screws 102. With the use of appropriate epoxy and syringes, the fiber can be secured inside of the ferrule with a suitable recess distance from ferrule end-face. 100 is the resultant connector ferrule with recessed cleaved HCF. With this embodiment a normal connector adapter can be used because the ferrule end-face will provide necessary contact force.

In another embodiment, the fiber recess is created using a special ferrule design feature where a reduced inner bore diameter 220 is created at the end-face of the ferrule to act as a stop for cleaved HCF end.

Figure 6:
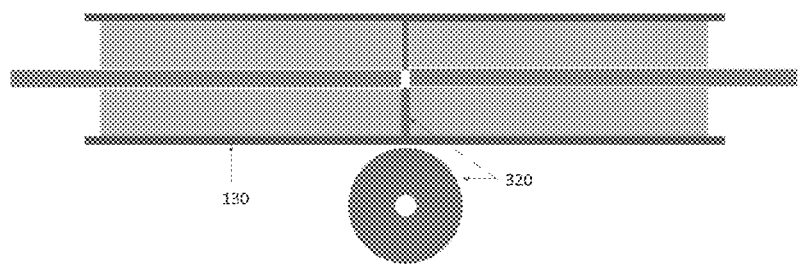
FIG. 6 shows a fourth embodiment with a spacer inside split sleeve of a "normal" connecter adapter creates air-gap.

In another embodiment, fiber can be cleaved without any recess and the air-gap is created using a spacer in connector body or inside the adapter body. One example of this embodiment type is shown in FIG. 6, where a spacer ring 320 with a center hole is placed inside the split sleeve 130. The adapter is otherwise a normal standard compliant adapter.

Figures 7A, 7B:
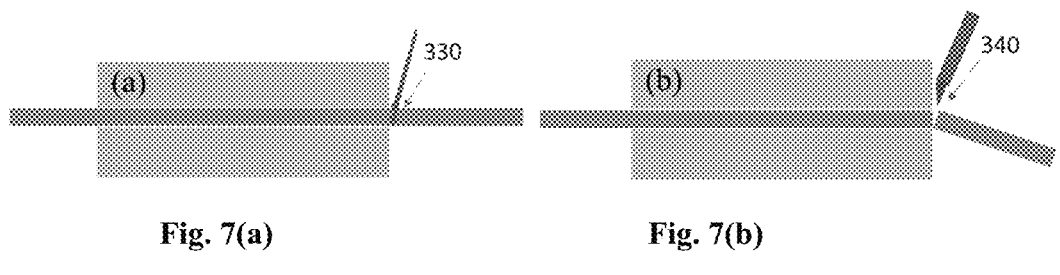
FIG. 7(a) shows laser cleaving of HCF after fixing the fiber in ferrule with epoxy.
FIG. 7(b) shows "scribed" cleaving of HCF after fixing the fiber in ferrule with epoxy.

In another embodiment, bumps in the ferrule are used to form spacers when mated to a second modified connector ferrule, thus creating a controlled gap between mating fibers. The bumps on first and second connector ferrules must have a specific orientation to make sure they are aligned correctly.

Where the cleaved HCF end-face is not recessed, as in the embodiment shown in FIG. 6, the cleaving can be done after the fiber is inserted inside the ferrule and fixed with epoxy, in at least two different ways. The first method is shown in FIG. 7(a), where cleaving is performed using laser. Another cleaving method is identical to current field termination, where the fiber is "scribed" with a diamond knife edge, and removed, as shown in FIG. 7(b). For laser cleaving, end-face surface quality is good enough and no polishing is needed. For scribing method, end-face must be polished, similar to the polishing process used for regular glass optical fiber connectors. Care must be taken to protect the hollow core structure of HCF at the end-face while polishing. For instance, choice of polishing paper is important. If a wet process is used, material pushed in and absorbed inside the hollow core structure must be sucked out.

Figure 8:
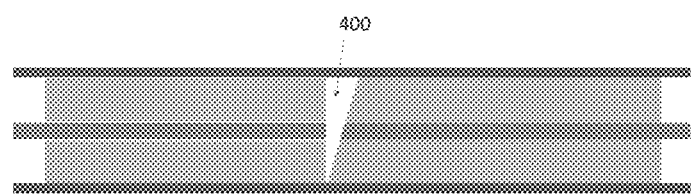
FIG. 8 shows terminating an HCF connector with normal single mode fiber, APC connector.

The embodiments disclosed so far allow HCF to HCF connectivity for HCF trunk cables and HCF patch cords. For connecting directly to active equipment with optical transceivers, a transition to single mode fiber patch cord must be included. Authors of this disclosure present an embodiment of air-gap HCF connectivity, where an airgap HCF connector can be connected directly to a single mode APC connector, as shown in FIG. 8. Because this method does not utilize mode adapter, there will be some higher order mode coupling into the single mode fiber. This can be removed with a proper mode filter.

What is claimed is:

1. An air-gap HCF connector termination method and connector assembly for factory and field connector assembly termination for patch cables and trunk cables made from HCF, where in multitude of mechanisms can facilitate air-gap between the first and second HCF fiber end-faces, comprising preparing the HCF end-faces using appropriate cleaving methods including mechanical, ultrasonic and laser cleaving, such that the air-gap separation between first and second HCF's can be anywhere between 0.5-100 microns, where reflection at the connector interface is low with RL>35 dB, due to HCF propagation mode effective index matching with index of air.

2. An air-gap HCF connector termination method and connector assembly according to claim 1, wherein the connector body type can be LC, SC, ST, FC and MPO style connector.

3. An air-gap HCF connector termination method and connector assembly according to claim 1, wherein the desired air-gap is created by a recessed fiber end-face on the ferrule end-face.

4. An air-gap HCF connector termination method and connector assembly according to claim 3, wherein the fiber recess is achieved using a mechanical fixture wherein a special ferrule cap fixed on the ferrule before inserting the cleaved HCF and before attaching it with epoxy creates the needed fiber recess without damaging the cleaved HCS end-face and a normal industry standard connector adapter can be used for terminating two HCF connectors with air-gap.

5. An air-gap HCF connector termination method and connector assembly according to claim 3, wherein the fiber recess is achieved using a modified ferrule with a mechanical feature that creates a fiber stop when inserting the cleaved end of the HCF inside the ferrule, where a normal industry standard connector adaptor can be used for terminating two HCF connectors with air-gap.

6. An air-gap HCF connector termination method and connector assembly according to claim 1, wherein the desired air-gap is created by a spacer inside the connector body, connector adapter or the ferrule, where the cleaved fiber end-face can be at the same plane as the ferrule end-face before the spacer is applied.

7. An air-gap HCF connector termination method and connector assembly according to claim 6, wherein the desired air-gap separation is achieved using a spacer in the form of a ring with hole in the center placed inside the connector adapter split sleeve, where the remainder of the connector adapter is identical to a normal industry standard connector adaptor.

8. An air-gap HCF connector termination method and connector assembly according to claim 6, wherein the end-face cleaving is done after the un-cleaved, stripped fiber is inserted in a normal ferrule, and fixed with epoxy, where fiber is scribed, cleaved and polished, similar to normal glass optical fiber end-face polishing.

9. An air-gap HCF connector termination method, wherein an HCF connector according to claim 1 is terminated with a normal single mode APC connector, where the reflection on the APC side is minimized (RL>55 dB), and where the HCF to SMF coupling loss is limited by the mode mismatch between the HCF and SMF fundamental propagation mode.

10. An air-gap HCF connector termination method and connector assembly for factory and field connector assembly termination for patch cables and trunk cables made from HCF, wherein the gap is produced by using and end cap that limits the distance between the inserted HCF and the end-face of the ferrule, comprising preparing the HCF end-faces using appropriate cleaving methods including mechanical, ultrasonic and laser cleaving, and wherein the air-gap separation between first and second HCF's can be anywhere between 0.5-100 microns, where reflection at the connector interface is low with RL>35 dB, due to HCF propagation mode effective index matching with index of air.

11. An air-gap HCF connector termination method and connector assembly for factory and field connector assembly termination for patch cables and trunk cables made from HCF, wherein the gap is produced using a special ferrule design feature where a reduced inner bore diameter, and/or a series of bumps in the ferrule to act as a stop for cleaved HCF, comprising preparing the HCF end-faces using appropriate cleaving methods including mechanical, ultrasonic and laser cleaving, and where the air-gap separation between first and second HCF's can be anywhere between 0.5-100 microns, where reflection at the connector interface is low with RL>35 dB, due to HCF propagation mode effective index matching with index of air.

* * * * *